United States Patent [19]

DiPietro et al.

[11] Patent Number: 5,411,692
[45] Date of Patent: May 2, 1995

[54] INTEGRAL RECLOSABLE BAG DIE ASSEMBLY

[75] Inventors: David DiPietro; Mladomir Tomic, both of Appleton, Wis.

[73] Assignee: Reynolds Consumer Products Inc., Appleton, Wis.

[21] Appl. No.: 225,862

[22] Filed: Apr. 11, 1994

[51] Int. Cl.⁶ .............................................. B29C 47/14
[52] U.S. Cl. .................................. 264/177.16; 156/66; 264/40.7; 225/131.1; 225/192 R; 225/461
[58] Field of Search ......... 264/177.10, 177.16–177.20, 264/173, 514, 40.7; 425/131.1, 133.5, 462, 461, 467, 192 R; 156/66

[56] References Cited

U.S. PATENT DOCUMENTS

| | | |
|---|---|---|
| 3,579,730 | 5/1971 | Ausnit ............................... 425/131.1 |
| 3,597,795 | 8/1971 | Naito . |
| 3,680,997 | 8/1972 | Dukert et al. ................... 425/192 R |
| 3,751,209 | 8/1973 | Schreiber ........................ 264/177.16 |
| 3,877,857 | 4/1975 | Melead . |
| 4,003,972 | 1/1977 | Herz ................................ 264/177.16 |
| 4,515,647 | 5/1985 | Behr . |
| 4,540,537 | 9/1985 | Kamp ..................................... 156/66 |
| 4,548,569 | 10/1985 | Pitigliano et al. . |
| 4,731,003 | 3/1988 | Maurilio et al. . |
| 4,731,004 | 3/1988 | Wenz, Jr. . |
| 4,822,539 | 4/1989 | Tilman et al. ........................ 156/66 |
| 4,832,960 | 5/1989 | Compagnon . |
| 4,985,192 | 1/1991 | Roeder et al. ........................ 156/66 |
| 5,067,432 | 11/1991 | Lippert ................................. 425/461 |
| 5,073,102 | 12/1991 | Guggiari . |
| 5,094,603 | 3/1992 | Gellert . |
| 5,104,305 | 4/1992 | Kawaguchi et al. . |
| 5,135,377 | 8/1992 | Gellert . |
| 5,162,121 | 11/1992 | Kawaguchi et al. . |
| 5,252,281 | 10/1993 | Kettner et al. ........................ 156/66 |
| 5,273,595 | 12/1993 | Tomic et al. .......................... 156/66 |
| 5,284,430 | 2/1994 | Tomic et al. ...................... 425/133.5 |

FOREIGN PATENT DOCUMENTS

| | | | |
|---|---|---|---|
| 0715961 | 8/1965 | Canada ............................ 425/192 R |
| 1286295 | 1/1969 | Germany ............................. 425/467 |
| 51-43054 | 11/1976 | Japan .............................. 264/177.17 |

Primary Examiner—Jeffery R. Thurlow
Attorney, Agent, or Firm—Alan T. McDonald

[57] ABSTRACT

An integral reclosable bag die assembly for extruding a bag film and a closure profile integrally connected thereto, includes a die including an inlet port for receiving molten polymeric material, an elongated outlet port for discharging the molten material, and a coat hanger plenum extending between the inlet and outlet ports for channeling the molten material from the inlet port to the outlet port. The outlet port includes a pair of elongated lips disposed opposite one another. One of the lips is detachably interlocked to a remaining portion of the die and has a closure profile extrusion site configured in the form of the closure profile. The plenum opens into a diverting channel at an upstream location thereof to divert a portion of the molten material from the plenum into the diverting channel. The diverting channel extends from the upstream location of the plenum to the closure profile extrusion site so as to feed the diverted portion of the molten material to the closure profile extrusion site and form the closure profile. The closure profile extrusion site can be a removable insert detachably interlocked to the one of the die lips and having the closure profile formed therein. A choker bar disposed within the plenum is used to spread the molten material flowing downstream through the plenum.

16 Claims, 2 Drawing Sheets

INTEGRAL RECLOSABLE BAG DIE ASSEMBLY

FIELD OF THE INVENTION

The present invention generally relates to dies and, more particularly, relates to an integral reclosable bag die assembly for co-extruding a plastic bag film and a closure profile.

BACKGROUND OF THE INVENTION

A reclosable plastic bag includes a plastic bag film having a pair of interlocking closure profiles attached thereto and disposed opposite one another at the bag mouth. Such a reclosable bag may be manufactured using a variety of extrusion techniques for forming the bag film and the closure profiles.

In one extrusion technique, an extruder feeds a molten polymeric material into a die which, in turn, extrudes the molten material in the form of an elongated bag film having a pair of closure profiles integrally connected thereto. The die is provided with a coat hanger shaped cavity or plenum extending from a narrow inlet port to an elongated outlet port. In such a "coat hanger" die, the plenum is arranged with its narrow end adjacent the narrow inlet portion and its wide end adjacent the elongated outlet port. This arrangement allows the plenum to spread molten polymeric material entering the inlet port as the material flows downstream through the plenum. A pair of closure profiles are grooved into one side or lip of the outlet port so as to provide the film exiting the outlet port with a pair of closure profiles. To change the thickness of the film exiting from the elongated outlet port, the die is provided with a plurality of lip adjusting screws arranged at several locations along one lip of the outlet port.. Manipulation of the screws varies the distance between the pair of lips forming the outlet port which, in turn, changes the thickness of the exiting film.

A drawback of the foregoing "coat hanger" die is that it is difficult to control the thickness of the film without adversely affecting the quality of the closure profiles extruded therewith. For example, manipulating the adjusting screws to make the exiting film thinner may force to much molten polymeric material into the profile-shaped grooves in the outlet port lip, thereby deforming the closure profiles formed by these grooves. A need therefore exists for an integral reclosable bag die assembly which overcomes the above-noted drawback associated with the foregoing "coat hanger" die.

SUMMARY OF THE INVENTION

Accordingly, the present invention provides an integral reclosable bag die assembly for extruding a bag film and a closure profile integrally connected thereto. The assembly includes a die having an inlet port for receiving molten polymeric material, an elongated outlet port for discharging the molten material, and a plenum extending between the inlet and outlet ports for channeling the molten material from the inlet port to the outlet port. The outlet port includes a pair of elongated lips disposed opposite one another with one of the lips having a closure profile extrusion site configured in the form of the closure profile. The plenum opens into a diverting channel at an upstream location thereof to divert a portion of the molten material from the plenum into the diverting channel. The diverting channel extends from the upstream location of the plenum to the closure profile extrusion site of the one of the lips so as to feed the diverted portion of the molten material to the closure profile extrusion site and form the closure profile.

BRIEF DESCRIPTION OF THE DRAWINGS

The advantages of the present invention will become apparent upon reading the following detailed description and upon reference to the accompanying drawings, in which.

DETAILED DESCRIPTION OF THE PREFERRED EMBODIMENT

Figure 1:
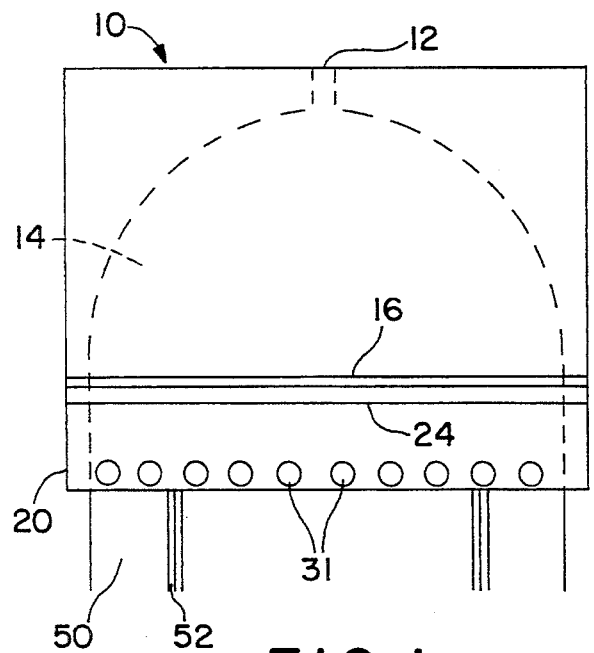
FIG. 1 shows a plan view of the integral reclosable bag die embodying the present invention.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents, and alternatives falling within the spirit and scope of the invention as defined by the appended claims.

Figure 2:
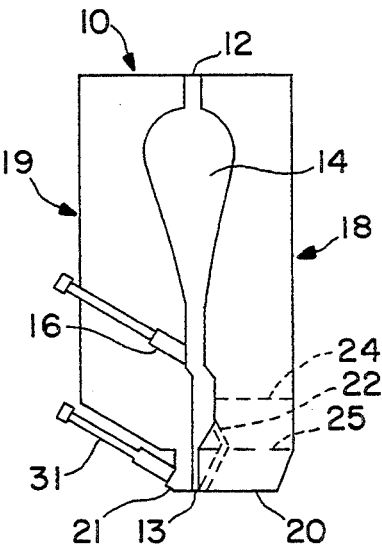
FIG. 2 is a side view of the die in FIG. 1.

Turning now to the drawings, FIGS. 1 and 2 illustrate an integral reclosable bag die 10 including an inlet port 12, an elongated outlet port 13, and a coat hanger plenum 14 connecting the inlet port 12 to the outlet port 13. To extrude a bag film 50 with a pair of closure profiles 52 integrally connected thereto, molten polymeric material is fed into the inlet port 12, channeled from the inlet port 12 to the outlet port 13 via the plenum 14, and discharged from the outlet port. The plenum 14 serves to gradually spread the molten material across the width of the die 10 as the molten material flows downstream through the die 10.

Figure 3:
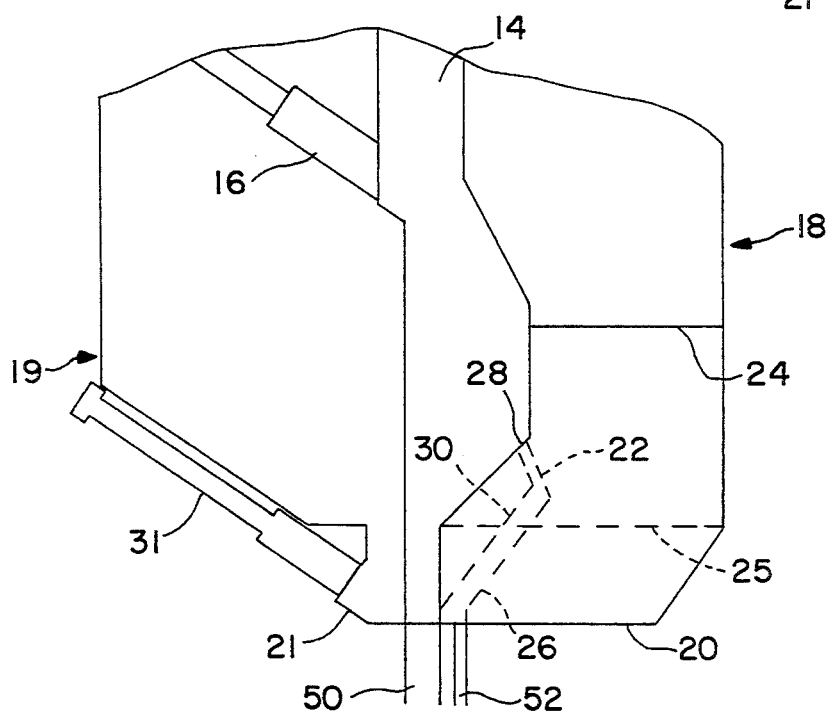
FIG. 3 is an enlarged fragmentary side view of the die in FIG. 1.

The die 10 is formed from front and back die plates 18, 19 which are separately machined and later connected together. The die plates 18, 19 include respective die lips 20, 21 with the die lip 20 being removable from the remainder of the back die plate 18. The removable die lip 20 is connected to the remainder of the back die plate 18 at the interface 24. Alternatively, the removable die lip 20 may be shortened so that it is connected at a more downstream interface 25. FIG. 3 illustrates the die lips 20, 21 forming the elongated outlet port 13 of the die 10.

The die 10 is optionally provided with a choker bar 16 mounted to the front die plate 19 and positioned slightly upstream relative to the removable die lip 20. Extending into the plenum 14 across the width thereof, the choker bar 16, when present, further spreads the molten polymeric material as it flows downstream passed the choker bar 16. The optional choker bar 16 may be adjusted to permit more molten material to flow into desired areas by bending the choker bar 16 or cutting notches into the bar 16.

Figure 4:
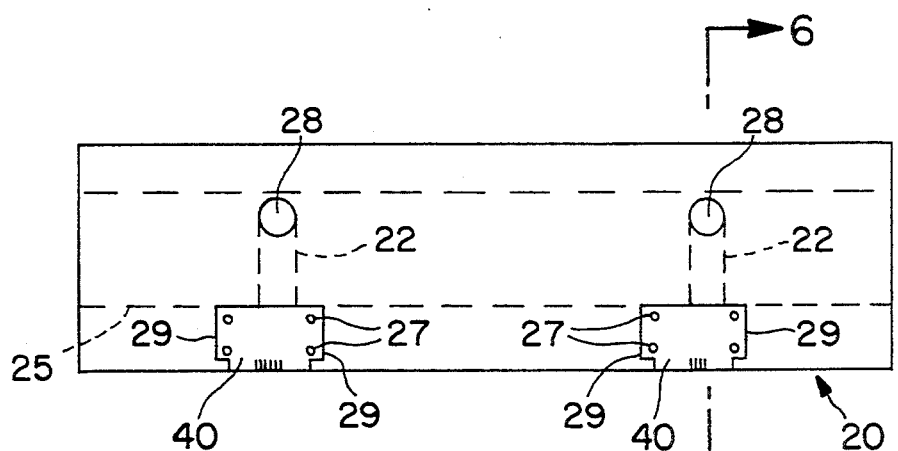
FIG. 4 is a plan view of a removable die lip of the die in FIG. 1.

After moving downstream, the molten polymeric material flows between the die lips 20, 21. It is at this point that a predetermined amount of molten material is diverted out of the plenum 14 into a pair of circular channels 22 formed in the removable die lip 20. The amount of diverted material is determined by the diameter of the circular channels 22 at their respective inlet ports 28. While the undiverted molten material continues to move downstream through the plenum 14 to the outlet port 13, the diverted material flows downstream through the circular channels 22 to their respective outlet ports 30. The outlet ports 30 are located directly upstream and adjacent respective closure profile extrusion sites 26 so that the circular channels 22 feed the diverted molten material to these sites 26. As illustrated in FIG. 4, the circular channels 22 are laterally aligned with the profile extrusion sites 26, and both the channels 22 and the profile extrusion sites 26 are relatively narrow compared to the width of the removable die lip 20.

The two closure profile extrusion sites 26 are grooved sections formed in the removable die lip 20 and extending from the outlet port 13 to a location slightly upstream from the outlet port 13. The sites 26 are configured in the form of the mating closure profiles 52. Therefore, the circular channels 22 are sized to divert a sufficient amount of material to make the closure profiles 52. As the diverted molten material exits the two outlet ports 30 of the channels 22, the diverted material reunites with the undiverted molten material in the plenum 14 because the profile extrusion sites 26 are in fluid communication with the plenum 14 in the region adjacent the outlet port 13. The undiverted material enters this region in the shape of an elongated film, while the diverted material is shaped by the profile extrusion sites 26 into the form of the mating closure profiles 52. The reunited flows of molten material exit the outlet port 13 in the form of the film 50 having the pair of closure profiles 52 integrally connected thereto.

Using the diverting channels 22 to feed the profile extrusion sites 26 allows one to easily control the thickness of the film 50 without adversely affecting the formation of the closure profiles 52. In particular, the thickness of the film 50 is controlled by the distance between the die lips 20, 21, which, in turn, is adjustable by manipulating a plurality of lip adjusting screws 31 mounted at several locations along the width of the die lip 21 (FIGS. 1-3). Since the die lips 20, 21 substantially restrict the undiverted molten material to a particular thickness at an upstream location relative to the profile extrusion sites 26, changing the film thickness by changing the distance between the die lips 20, 21 does not affect the diverted material entering the profile extrusion sites 26. Instead, the closure profiles are formed almost entirely from the diverted molten material exiting the channels 22 so that the undiverted material has no significant effect on closure profile formation.

To adjust the amount of molten polymeric material diverted from the plenum 14, the removable die lip 20 is removed. Next, if it is desired that more material be diverted from the plenum 14, then the removed die lip 20 is either modified to provide larger diverting channels 22 or replaced with another removable die lip 20 having larger diverting channels 22. If, however, it is desired that less material be diverted from the plenum 14, then the removed die lip 20 is replaced with another die lip having smaller diverting channels 22.

Similarly, to change the configuration of the profile extrusion sites 26 and thereby change the configuration of the extruded closure profiles 52, the removable die lip 20 is removed. If possible, the profile extrusion sites 26 on the removed die lip 20 are reconfigured; otherwise, the removed die lip 20 is replaced with another die lip having differently-configured profile extrusion sites 26. The removable die lip 20 permits quick, convenient and economical change of closure profile designs by facilitating modifications to the diverting channels 22 and the profile extrusion sites 26.

Figure 5:
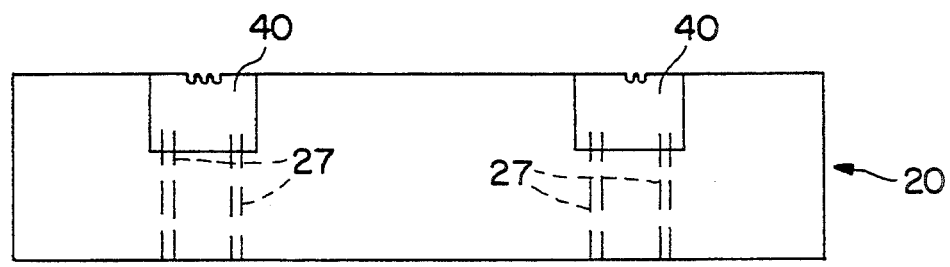
FIG. 5 is an end view of the removable die lip in FIG. 4.
Figure 6:
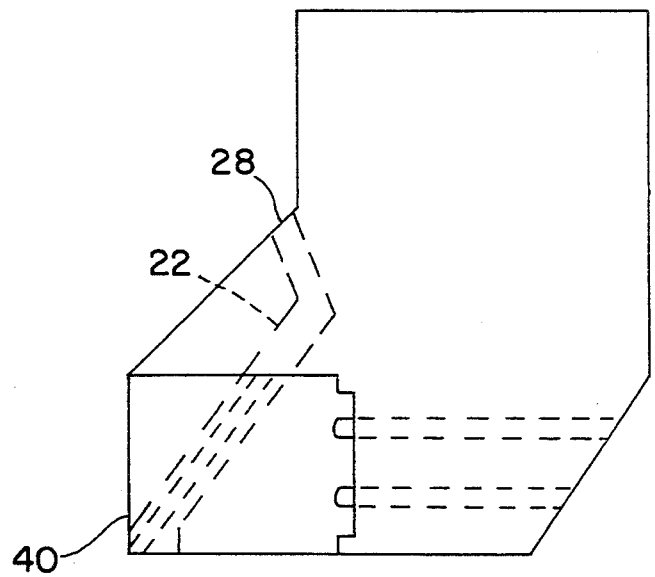
FIG. 6 is a section taken generally along the line 6—6 in FIG. 4.

In an alternative embodiment, the profile extrusion sites 26 of the removable die lip 20 are removable inserts detachable interlocked with the die lip 20 by interlocking means 27 such as bolts or screws. These inserts are designated by the reference numeral 40 in FIGS. 4-6. To change the configuration of the extruded closure profiles 52, the inserts 40 are detached from the die lip 20 and replaced with differently-configured inserts (see FIGS. 4-6). As shown in FIGS. 4 and 5, the inserts 40 are preferably small relative to the length, width, and depth of the removable die lip 20. Forming the profile extrusion sites 26 on removable inserts further facilitates changes to closure profile designs.

If the removable die lip 20 is shortened so that it is connected to the remainder of the back die plate 18 at the interface 25, the inserts 40 may be taper locked within respective mating slots formed in the die lip 20. More specifically, sides 29 (FIG. 4) of the removable inserts 40 are modified to taper inwardly from respective upstream ends thereof, and the side walls of the slots are tapered to match the tapers of the respective inserts. The tapered sides of the inserts engage the tapered side walls of the respective slots. To remove the inserts, the shortened die lip 20 is detached from the remainder of the back die plate 18 and the inserts are slid out of their respective slots (e.g., upward in FIG. 4). To replace the inserts with new inserts, the new inserts are first slid into their respective slots (e.g., downward in FIG. 4) and the shortened die lip 20 is subsequently reconnected to the remainder of the back die plate 18. The manufacturer of reclosable bags may then proceed with extruding the film 50 together with the new closure profile design.

While the present invention has been described with reference to one or more particular embodiments, those skilled in the art will recognize that many changes may be made thereto without departing from the spirit and scope of the present invention. For example, the coathanger type die 10 may be replaced with other types of film dies which will take advantage of the diverting channels 22 feeding the respective profile extrusion sites 26. The diverting channels 22 permit control of film thickness without adversely affecting the closure profiles 52 extruded from the profile extrusion sites 26. Each of these embodiments and obvious variations thereof is contemplated as falling within the spirit and scope of the claimed invention, which is set forth in the following claims.

What is claimed is:

1. An integral reclosable bag die assembly for extruding a bag film and a closure profile integrally connected thereto, comprising a die including an inlet port for receiving molten polymeric material, an elongated outlet port for discharging the molten material, and a plenum extending between said inlet and outlet ports for channeling the molten material from said inlet port to said outlet port and for spreading the molten material across the die therein, said outlet port including a pair of elongated lips disposed opposite one another, one of said lips having a closure profile extrusion site configured in the form of the closure profile, said plenum opening into a diverting channel positioned within the die and beginning at a location upstream of said closure profile extrusion site of said one of said lips and downstream of at least the majority of said spreading within said plenum to divert a portion of the molten material from said plenum into said diverting channel, said diverting channel extending from said location to said closure profile extrusion site of said one of said lips so as to feed the diverted portion of the molten material to said closure profile extrusion site and form the closure profile.

2. The die assembly of claim 1, wherein said plenum is configured with a coat hanger shape.

3. The die assembly of claim 1, wherein said one of said die lips is detachably interlocked to a remaining portion of said die.

4. The die assembly of claim 3, wherein said one of said die lips includes said closure profile extrusion site.

5. The die assembly of claim 4, wherein said one of said die lips includes said diverting channel and said closure profile extrusion site.

6. The die assembly of claim 3, wherein said closure profile extrusion site includes an insert detachably interlocked to said one of said die lips and having the closure profile formed therein.

7. The die assembly of claim 1, wherein said closure profile extrusion site includes an insert detachably interlocked to said die and having the closure profile formed therein.

8. The die assembly of claim 1, further including a choker bar disposed within said plenum for spreading the molten material flowing downstream through said plenum.

9. An integral reclosable bag die assembly for extruding a bag film and a closure profile integrally connected thereto, comprising a die including an inlet port for receiving molten polymeric material, an elongated outlet port for discharging the molten material, and a plenum extending between said inlet and outlet ports for channeling the molten material, from said inlet port to said outlet port and for spreading the molten material across the die therein, said outlet port including a pair of elongated lips disposed opposite one another, one of said lips being detachably interlocked to a remaining portion of said die and having a closure profile extrusion site configured in the form of the closure profile, said plenum opening into a diverting channel positioned within said die and beginning at a location upstream of said closure profile extrusion site of said one of said lips and downstream of at least the majority of said spreading within said plenum to divert a portion of the molten material from said plenum into said diverting channel, said diverting channel extending from said location to said closure profile extrusion site of said one of said lips so as to feed the diverted portion of the molten material to said closure profile extrusion site and form the closure profile.

10. The die assembly of claim 9, wherein said plenum is configured with a coat hanger shape.

11. The die assembly of claim 9, wherein said one of said die lips includes said diverting channel.

12. The die assembly of claim 9, wherein said closure profile extrusion site includes an insert detachably interlocked to said one of said die lips and having the closure profile formed therein.

13. The die assembly of claim 9, further including a choker bar disposed within said plenum for spreading the molten material flowing downstream through said plenum.

14. A method for extruding a bag film and a closure profile integrally connected thereto, comprising the steps of:

feeding a stream of molten polymeric material into an inlet port of a die;

channeling the stream of molten polymeric material through a plenum extending between the inlet port and an outlet port of the die, the plenum spreading the stream of molten polymeric material across the die and shaping the stream of molten polymeric material into the bag film;

diverting a portion of the stream of molten polymeric material from the plenum into a diverting channel tapping the stream of molten polymeric material subsequent to said spreading;

feeding the diverted portion of the molten polymeric material to a closure profile extrusion site configured in the form of a closure profile; and reuniting the diverted portion with the stream of molten polymeric material prior to exiting the outlet port of the die.

15. The method of claim 14, further including the step of distributing the stream of molten material in varying amounts along the width of the plenum using a choker bar extending into the plenum.

16. The method of claim 14, further including the step of changing the depth of the plenum near the outlet port of the die so as to change the thickness of the bag film exiting the outlet port while maintaining the form of the closure profile exiting the outlet port.

* * * * *